United States Patent
Keller et al.

(10) Patent No.: US 11,775,719 B1
(45) Date of Patent: Oct. 3, 2023

(54) CELL INSTANCE CHARGE MODEL FOR DELAY CALCULATION

(71) Applicant: Cadence Design Systems, Inc., San Jose, CA (US)

(72) Inventors: Igor Keller, Pleasanton, CA (US); Xiaopeng Dong, San Jose, CA (US); Sourabh Rajguru, La Jolla, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 26 days.

(21) Appl. No.: 17/713,004

(22) Filed: Apr. 4, 2022

(51) Int. Cl.
  *G06F 30/30* (2020.01)
  *G06F 30/3315* (2020.01)
  *G06F 119/12* (2020.01)

(52) U.S. Cl.
  CPC ...... G06F 30/3315 (2020.01); *G06F 2119/12* (2020.01)

(58) Field of Classification Search
  CPC .......................... G06F 30/3315; G06F 2119/12
  USPC ........................................................ 716/108
  See application file for complete search history.

(56) References Cited

U.S. PATENT DOCUMENTS

| | | | | |
|---|---|---|---|---|
| 6,473,888 B1* | 10/2002 | Nassif | ..................... | G06F 30/33 716/113 |
| 6,606,587 B1* | 8/2003 | Nassif | ..................... | G06F 30/33 716/113 |
| 8,515,725 B2* | 8/2013 | Feldmann | ............. | G06F 30/367 703/4 |
| 9,928,324 B1* | 3/2018 | Keller | ................ | G06F 30/3312 |

\* cited by examiner

*Primary Examiner* — Jack Chiang
*Assistant Examiner* — Brandon Bowers
(74) *Attorney, Agent, or Firm* — Schwegman Lundberg & Woessner, P.A.

(57) ABSTRACT

Various embodiments provide a charge model for a cell instance for delay calculation of a circuit design that includes the cell instance, where the charge model can be part of electronic design automation (EDA) and used in timing analysis of a circuit design that includes the cell instance. The charge model generated by an embodiment can predict a charge at an input of a cell instance for an arbitrary input voltage waveform and can address (e.g., reduce or negate) a time delay impact the Miller effect has on the cell instance.

20 Claims, 6 Drawing Sheets

CELL INSTANCE CHARGE MODEL FOR DELAY CALCULATION

TECHNICAL FIELD

Embodiments described herein relate to circuit design and, more particularly, to systems, methods, devices, and instructions for a charge model for a cell instance for delay calculation of a circuit design that includes the cell instance, where the charge model can be part of electronic design automation (EDA).

BACKGROUND

During design of a circuit design, static timing analysis (STA) is performed on the circuit design to calculate time delays between inputs and outputs (e.g., input and output pins) of the circuit design. STA can be used to determine best- and worst-case timing delays of a circuit design independent of its inputs. Additionally, time delay information from STA can be used to determine how well an integrated circuit design should perform and what levels of yield and reliability those integrated circuit designs should have.

BRIEF DESCRIPTION OF THE DRAWINGS

Various ones of the appended drawings merely illustrate example embodiments of the present disclosure and should not be considered as limiting its scope.

DETAILED DESCRIPTION

Various embodiments provide for a charge model for a cell instance for delay calculation of a circuit design that includes the cell instance, where the charge model can be part of EDA and used in timing analysis (e.g., STA) of a circuit design that includes the cell instance. In particular, various embodiments described herein generate (e.g., construct) a charge model for an input of a cell instance based on delay models (e.g., from library data or timing library data, such as Liberty files) for the cell instance. A charge model generated by an embodiment comprises a single-state model of a charge at an input of a cell instance. The resulting charge model can represent an accurate model for determining (e.g., calculating) charge an input of a cell instance as a function of time and input voltage.

According to some embodiments, a charge model generated for a cell instance can be used to calculate time delay within a circuit design that includes the cell instance. For instance, when a STA process is performed on the circuit design, the STA process (e.g., time delay calculation engine associated with the STA process) solves the circuit design for each stage, where the stage comprises a driver, one or more receivers coupled to the driver, and interconnect parasitics. A receiver in the stage can comprise a cell instance (e.g., from a cell library), such as a buffer, an inverter, and the like.

Figure 2:
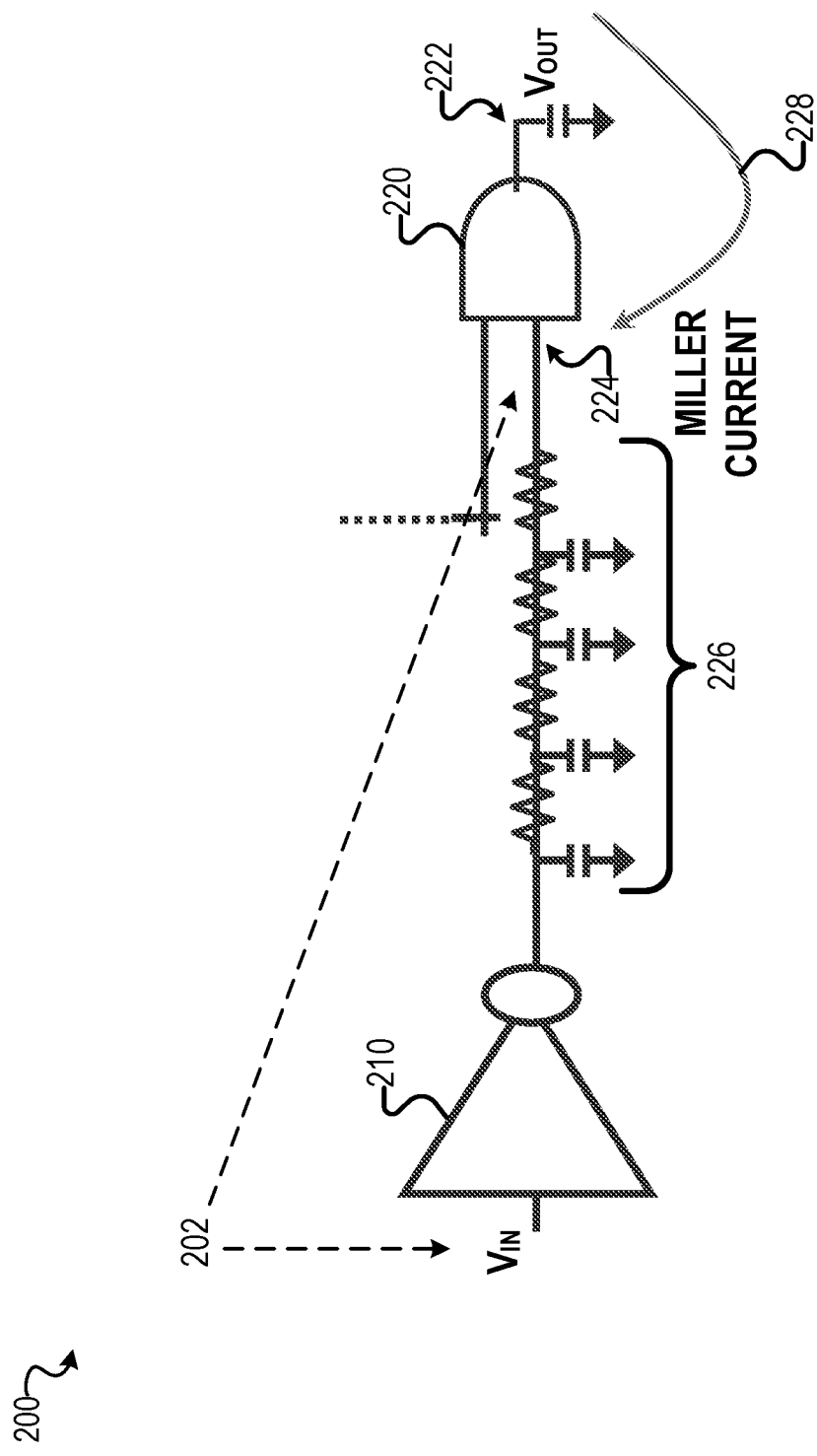
FIG. 2 is a circuit schematic illustrating an example stage within a circuit design, according to some embodiments.
Figure 3:
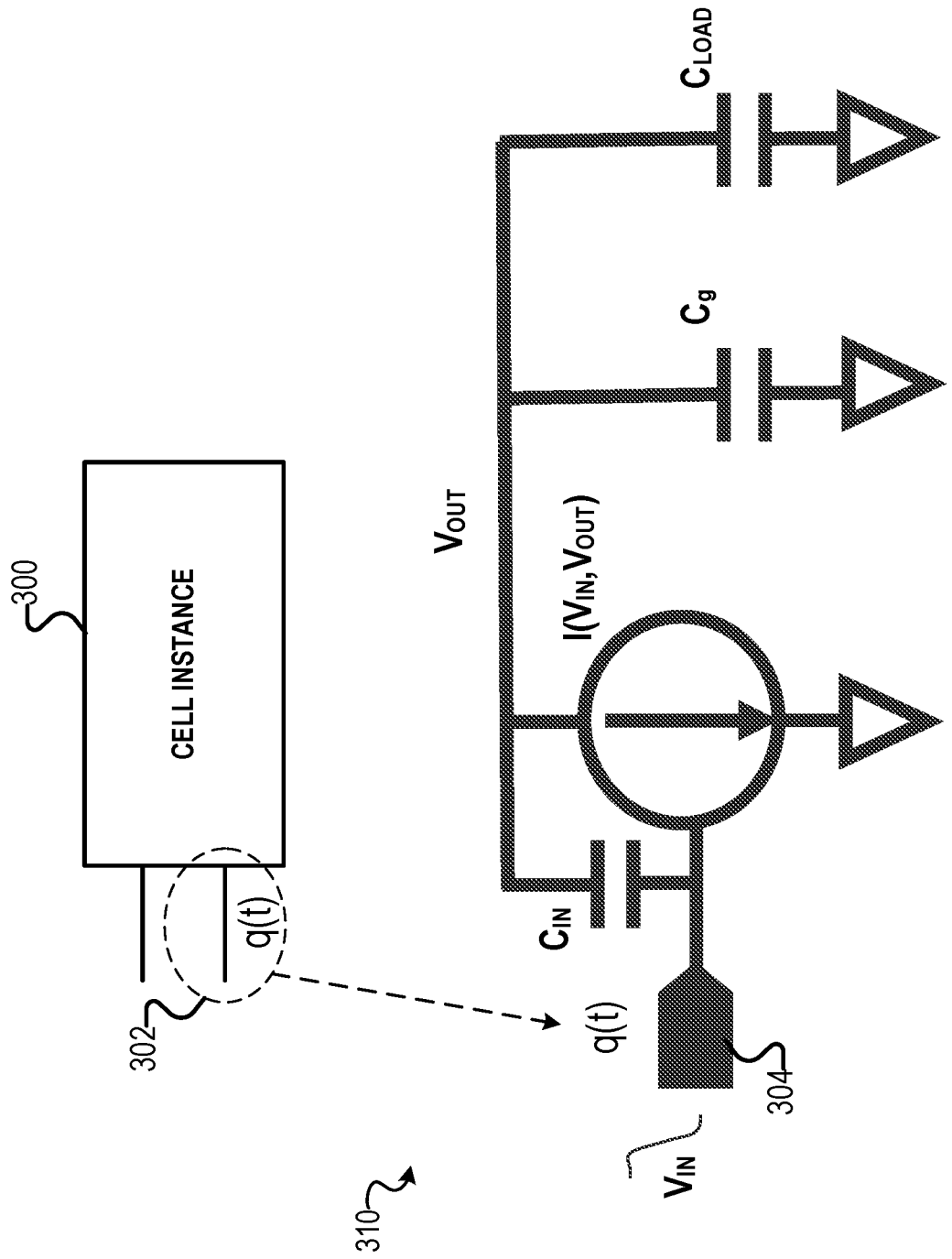
FIG. 3 is a circuit schematic illustrating an example of a simple model circuit that represents a charge model for an input of a cell instance, according to some embodiments.

Generally, receivers of a stage experience a timing delay due to a back-Miller effect, where current (e.g., Miller current) from a receiver's output is injected back into the receiver's input when the receiver's output (e.g., Vout(t)) transitions over time. For instance, the back-Miller effect can be strongest where an input voltage to an input of a cell instance is slow compared to an output voltage of the cell instance. FIG. 2 illustrates an example of a back-Miller effect with respect to an example stage of a circuit design. A charge model generated by an embodiment described herein can predict a charge at an input of a cell instance for an arbitrary input voltage waveform (e.g., that can be different from input voltage waveform provided by library data of the cell instance) and can also address (e.g., reduce or negate) the time delay impact the back-Miller effect has on the cell instance (e.g., receiver), thereby facilitating more accurate time delay calculations with respect to the cell instance. FIG. 3 illustrates an example of a simple model circuit that represents a generated charge model.

For some embodiments, a charge model is generated based on a following Equation 1, which relates a charge q at an input (e.g., an input pin or input node) of a cell instance to input and output voltages of the cell instance:

$$q = C_{IN} * V_{IN} + C_{BM} * V_{OUT},$$

where $C_{IN}$ is a static input capacitance at the input, where $V_{IN}$ is an input voltage at the input, where $C_{BM}$ is a back-Miller capacitance at the input (where the back-Miller capacitance connects the input to the output), and where $V_{OUT}$ is an output voltage at an output (e.g., an output pin or output node) of the cell instance. For instance, based on Equation 1, the following can represent the charge model for charge q at the input:

$$\frac{dq}{dt} = r(Vin)q - f(Vin) + K\frac{dVin}{dt}, \quad \text{Equation 2}$$

where $r = g/(C_{OUT}C_{BM})$, where g represents admittance of a first stage of the cell, where $f = gF_{DC}/C_{OUT} + gV_{IN}C_{IN}/C_{BM}$, where $K = C_m/C_{OUT} + C_{IN}/C_{BM}$ and is a constant (e.g., constant real number), where $C_m$ is the forward Miller capacitance, and where $V_{IN}$ is a known input voltage waveform (e.g., available as a function of time in piece-wise linear (PWL) form), which can be provided by waveform data (e.g., from the library data, such as timing library data for the cell instance). Each of r and f can comprise a vector of length N+1 that corresponds to N number of different voltage thresholds (e.g., $V_0, V_1, \ldots V_P$). For some embodiments, one or more of r, f, and K (of Equation 2) comprise (e.g., represent) a set of parameters of the generated charge model. The charge model generated can represent a simple model circuit that is adjacent to, and coupled to, the input pin of the cell instance. For some embodiments, the charge model is generated based on a discretized formulation, which can reduce the charge model to a recursive relationship. An example of the discretized formulation (based on Equation 2) is represented by the followin $$q_{m,i} - q_{m,i-1} = \frac{h_{m,i-1}}{2} * (G_{m,i} + G_{m,i-1}) - K * (V_{m,i} - V_{m,i-1}), \quad \text{Equation 3}$$

where $G_{m,i}=r_i*q_{m,i}+f_i$, where $h_{m,i}=T_{m,i+1}-T_{m,i}$ where m denotes a slew index (e.g., $1 \leq m \leq M$, where M corresponds to the M waveforms provided by the waveform data) that corresponds to a specific slew value, where i denotes a threshold voltage index (e.g., $1 \leq i \leq N$, where N corresponds to the N different threshold voltages described by the waveform data) that corresponds to a specific threshold voltage (e.g., specific predefined threshold voltage described by the waveform data), where refers to an input voltage (e.g., at the input of the cell instance) corresponding to a slew index m and a threshold index i, and where refers to waveform timepoints for a waveform corresponding to slew index m.

According to some embodiments, generating the charge model comprises generating a plurality of equations based on a formulation, the waveform data, and the input capacitance data, where the plurality of equations have a set of parameters. For instance, where the formulation is the discretized formulation of Equation 3, the set of parameters comprises r, f, and K. For some embodiments, the set of parameters are unknown values for the plurality of equations, which can be determined by a fitting process as described herein.

At least one of the waveform data or the input capacitance data for the cell instance can be provided by library data (e.g., timing library data) for the cell instance. The waveform data can, for example, describe a plurality of waveforms (e.g., M waveforms) for an input of the cell instance, where the M waveforms correspond to different slews (e.g., M different slews) at the input of the cell instance. Each of the M waveforms can be defined by a set of timepoints at which specific voltages are reached for a given voltage threshold. Further, the waveform data can describe, for the set of timepoints, a separate set of M waveforms for each different (predefined) threshold voltage (e.g., N separate sets of M waveforms for N different threshold voltages). Library data (e.g., timing library data) used by various embodiments can comprise input capacitance tables for the input of the cell instance. The input capacitance table can, for example, be a function of one or more voltage level, input slew, or output load (e.g., defined in timing arc or input pin scopes).

For some embodiments, the waveform data comprises, for N different threshold voltages, N sets of different M waveforms corresponding to M slews, and the plurality of equations (based on the formulation, the waveform data, and the input capacitance data) comprises M*N equations. For example, based on the formulation of Equation 3, each of the M*N equations can have N+1 unknown values for parameters r, f, and K, which results in 2*(N+1)+1 total unknown values for the M*N equations.

After the charge model is generated, various embodiments can fit the charge model (e.g., fit parameters of the charge model, such as one or more of r, f, and K) based on waveform data for the cell instance, input capacitance data for the cell instance, or both. Additionally, an embodiment can fit the charge model by considering the time points at which the waveforms reach threshold voltages (e.g., at $T_{m,i}$).

In particular, some embodiments fit the charge model by determining (e.g., finding) a set of values (e.g., parameter values) for a set of parameters of the plurality of equations generated for the charge model. For instance, an embodiment can fit the M*N equations of the plurality of equations by using a least squares function or operation to determine (e.g., find) the set of values for the set of parameters (e.g., parameters r, f, and K, which are unknown after generation of the plurality of equations) that solve, or approximately solve, some or all of the plurality of equations. In determining the set of values that solve (or approximately solve) the plurality of equations using least squares, an embodiment can use the following $$r_{opt}, f_{opt}, K_{opt} = \quad \text{Equation 4}$$
$$\operatorname{argmin}\left(\sum\nolimits_{m=1}^{M} \sum\nolimits_{k=1}^{N} \left(r_i q_{m,i} - f_i - \left(\frac{dq_m}{dt}\right)_i + K\left(\frac{dv_m}{dt}\right)_i\right)^2\right).$$

When determining the set of values for the set of parameters (e.g., using least squares), some embodiments can use the following Equation 5 as a ground truth:

$$q_{m,i+1}-q_{m,i}=C_{m,i+1}*(V_{m,i+1}-V_{m,i}),$$

where $q_{m,0}=0$, where m denotes a slew index (e.g., $1 \leq m \leq M$, where M corresponds to the M waveforms provided by the waveform data), where $C_m$ is the forward Miller capacitance, and where i denotes a threshold voltage index (e.g., $1 \leq i \leq N$, where N corresponds to the N different threshold voltages described by the waveform data). Various embodiments store (e.g., on a computer-readable medium) the determined set of values for use in performing timing analysis (e.g., STA) of a circuit design that includes the cell instance.

Eventually, when timing analysis (e.g., STA) is to be performed on a circuit design that includes the cell instance, the stored set of values for the set of parameters can be retrieved (e.g., from a computer-readable medium). Some embodiments perform timing analysis of the circuit design by using the stored set of values for the set of parameters with a charge prediction equation to calculate a timing delay for the circuit design, where the charge prediction equation comprises the set of parameters. For some embodiments, using the stored set of values for the set of parameters with the charge prediction equation results in an equation (e.g., fitted charge prediction equation) that can predict a charge at the input of the cell instance for an arbitrary input voltage waveform, which can be different from input voltage waveform (e.g., pre-driver waveform) provided by the library data. During time analysis, various embodiments use the resulting charge prediction equation to predict one or more charges at the input of the cell instance (e.g., at arbitrary input voltage values), and the predicted one or more charges can be used to calculate a time delay in the circuit design. For some embodiments, the charge prediction equation comprises Equation 3, where values for parameters r, f, and K are provided from the stored set of values. When using Equation 3, various embodiments can start with $q_{m,0}=0$.

As used herein, a charge model generated by an embodiment can be referred to as an input pin charge model, an input charge model, or a pin-charge model.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
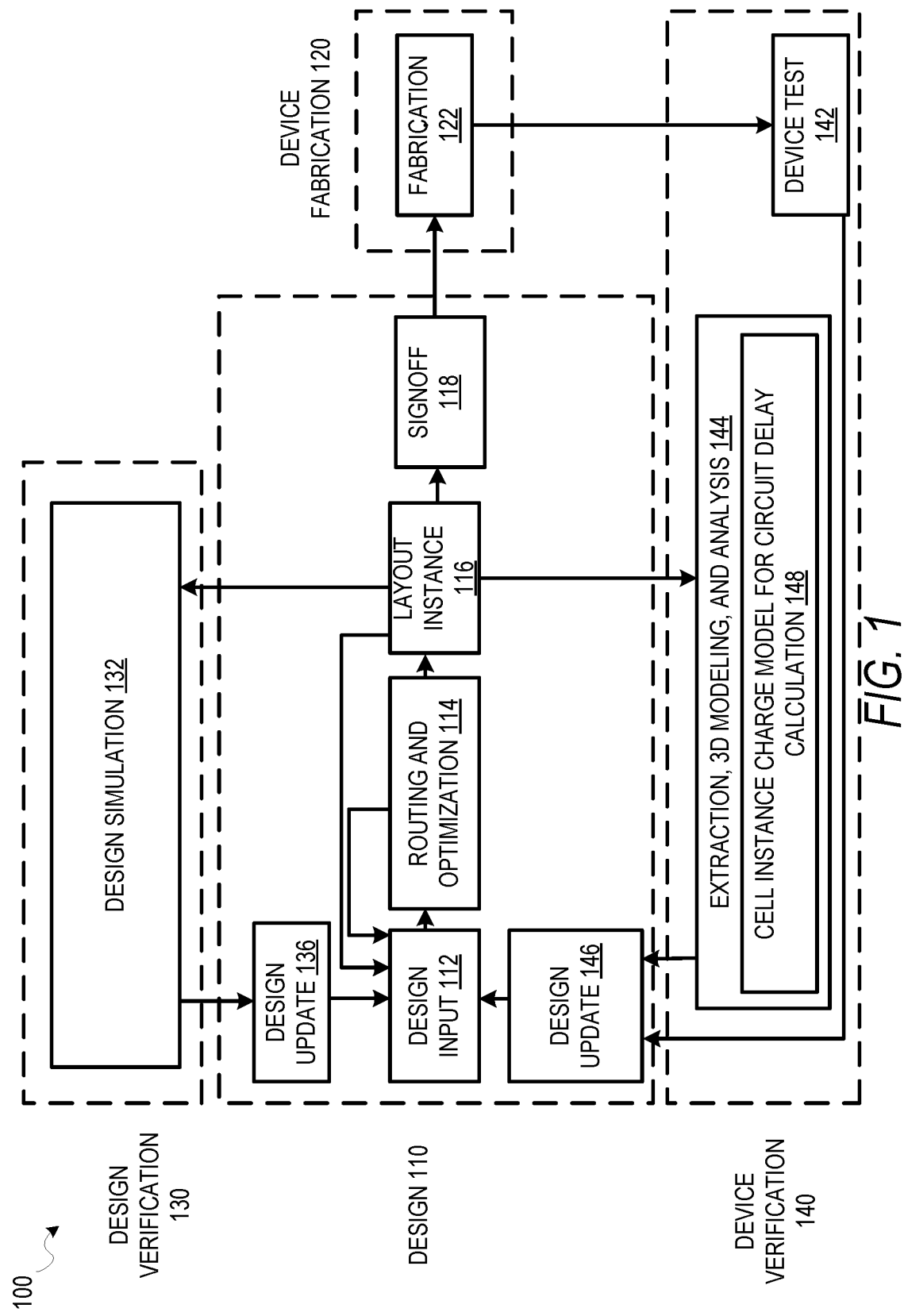
FIG. 1 is a diagram illustrating an example design process flow for generation or use of a charge model for a cell instance, according to some embodiments.

FIG. 1 is a diagram illustrating an example design process flow 100 for generation or use of a charge model for a cell instance, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes.

While the design process flow 100 shows optimization occurring prior to a layout instance 116, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

As shown, the extraction, 3D modeling, and analysis 144 operation includes a cell instance charge model for circuit delay calculation 148 operation (hereafter, charge model 148 operation), which may be performed in accordance with various embodiments described herein. The charge model 148 operation can generate a charge model generated for an input of a cell instance, or use/facilitate use of the charge mode (e.g., for performing timing analysis of a circuit design), in accordance with various embodiments. More regarding how the charge model 148 operation can be performed is described herein with respect to FIG. 4.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

FIG. 2 is a circuit schematic 200 illustrating an example stage within a circuit design, according to some embodiments. In particular, the circuit schematic 200 illustrates an impact of a back-Miller effect on an input 224 of a receiver 220, where the back-Miller effect is represented by a Miller current 228 from an output 222 to the input 224. The receiver 220 represents a cell instance, for which various embodiments described herein can generate a charge model. As shown, the input of the receiver 220 is coupled to a driver 210 having a voltage input of $V_{IN}$. The receiver 220 has the output 222 (e.g., output pin) that outputs a voltage output ($V_{OUT}$). Circuit elements 226 of the circuit schematic 200, which includes capacitors and resistors, can represent the interconnect parasitics between the driver 210 and the receiver 220. A time delay 202 the between the input voltage $V_{IN}$ and the output voltage $V_{OUT}$, which represents the time delay of a signal through the stage, can be impacted by the circuit elements 226 and the Miller current 228.

FIG. 3 is a circuit schematic illustrating an example of a simple model circuit 310 that represents a charge model for an input 302 (e.g., input pin) of a cell instance 300, according to some embodiments. The simple model circuit 310 can represent a macro model of a non-linear receiver (e.g., receiver 220 of FIG. 2). In FIG. 3, a cell instance 300 comprises an input 302, which can be a charge q as a function of time t. The cell instance 300 represents a cell instance for which a charge model can be generated. The cell instance 300 can comprise, for example, a buffer or an invert. For some embodiments, the cell instance 300 comprises a multi-stage cell. The simple model circuit 310, which represents a charge model for the input 302, comprises an internal node 304, which can receive a known input voltage waveform $V_{IN}$ (e.g., from waveform data for the cell instance 300). As shown, the simple model circuit 310 has an intrinsic output capacitance $C_g$, a load capacitance $C_{LOAD}$ of an interconnect and downstream circuit coupled to an output (e.g., output pin) of the cell instance 300, and an output voltage $V_{OUT}$, which represents a voltage response at the internal node 304 based on the input voltage at the internal node 304. q(t) can represent an unknown charge at the input 302, which can be predicted by a charge model generated in accordance with various embodiments.

Figure 4:
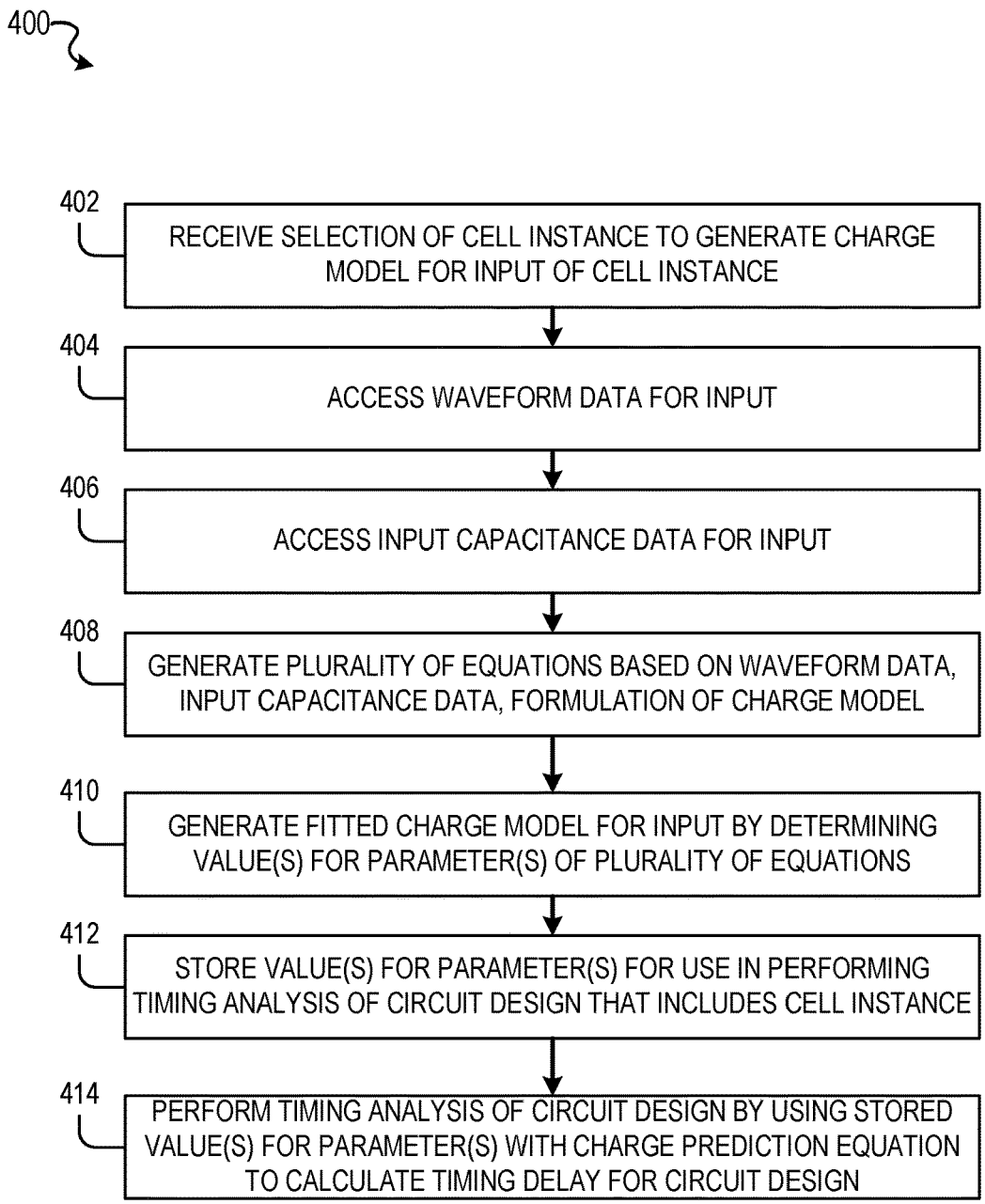
FIG. 4 is a flowchart illustrating an example method for a charge model for a cell instance for delay calculation of a circuit design, according to some embodiments.

FIG. 4 is a flowchart illustrating an example method 400 for a charge model for a cell instance for delay calculation of a circuit design, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 400 of FIG. 4 may be represented by executable instructions that, when executed by a hardware processor of a computing device, cause the computing device to perform the method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Depending on the embodiment, the method 400 can be performed prior to, or as part of, a timing analysis process performed on a circuit design.

Referring now to FIG. 4, a selection of a cell instance is received at operation 402, where the selection is to generate a charge model for an input of the cell instance. For example, prior to performing time analysis (e.g., STA) of a circuit design that includes the cell instance, a user can select the cell instance (e.g., through a command line or a graphical user interface) for generation of the charge model. As described herein, the charge model to be generated can predict a charge at the input of the cell instance for an arbitrary input voltage waveform.

At operation 404, waveform data for the input of the cell instance is accessed and, at operation 406, input capacitance data for the input is accessed. For some embodiments, the waveform data, the input capacitance data, or both can be provided by library data for the cell instance, such as a timing library for the cell instance. Depending on the embodiment, the library data can be provided by cell library data, such as a Liberty file associated with the cell instance. For some embodiments, the waveform data describes one or more waveforms (e.g., pre-driver waveforms) for the input of the cell instance. For example, the waveform data can describe a plurality of waveforms (e.g., M waveforms) for an input of the cell instance, where the M waveforms can correspond to different slews (e.g., M different slews) at the input of the cell instance, and where each of the M waveforms can be defined by a set of timepoints at which specific voltages are reached for a given voltage threshold. Additionally, the waveform data can describe, for the set of timepoints, a separate set of M waveforms for each different (predefined) threshold voltage (e.g., N separate sets of M waveforms for N different threshold voltages). Accordingly, the plurality of waveforms described by the waveform data can comprise different pluralities of waveforms for different voltage thresholds. For example, the plurality of waveforms can correspond to M different slew index values and N different threshold voltage index values. For some embodiments, the input capacitance data comprises a pin-cap table. The equation used for determining the set of values using least squares can comprise Equation 4.

During operation 408, a plurality of equations is generated based on a formulation of the charge model, the waveform data accessed at operation 404, and the input capacitance data accessed at operation 406. For some embodiments, the plurality of waveforms described by the waveform data correspond to M different slew index values and N different threshold voltage index values, and the plurality of equations generated by operation 408 comprises M×N equations. Each equation in the plurality of equations can correspond to a different timepoint in an individual waveform of the plurality of waveforms. For some embodiments, the formulation comprises a discretized formulation of an input charge at the input of the cell instance, where, for example, the input charge can be determined by Equation 1. According to some embodiments, the discretized formulation comprises Equation 3.

At operation 410, a fitted charge model for the input is generated by determining a set of values for a set of parameters of the plurality of equations. For example, where the discretized formulation comprises Equation 3, the set of parameters can comprise r, f, and K. Operation 410 can represent fitting the set of parameters to the plurality of equations. In various embodiments, determining the set of values for the set of parameters of the plurality of equations comprises using least squares to determine the set of values for the set of parameters that solves (or at least approximately solves) the plurality of equations. This can represent a global least squares approach for determining the set of values for the set of parameters. Alternatively, for some embodiments, determining the set of values for the set of parameters of the plurality of equations comprises using least squares to determine the set of values for the set of parameters that solves (or at least approximately solves) a sub-plurality of equations in the plurality of equations. This can represent a partial least squares approach for determining the set of values for the set of parameters. Where the partial least squares approach is used, the sub-plurality of equations can comprise 2N+1 equations selected (e.g., randomly or arbitrarily selected) from the plurality of equations, where N represents the number of different threshold voltage index values described by the waveform data in connection with the plurality of waveforms.

Thereafter, at operation 412, the set of values determined at operation 410 is stored (e.g., on a computer-readable medium) for use in performing timing analysis (e.g., STA) of a circuit design that includes the cell instance. For example, the determined set of values can be stored within, or in association with, library data for the cell instance. Eventually, at operation 414, timing analysis (e.g., STA) of the circuit design is performed by using the set of values (e.g., stored by operation 412) for the set of parameters with a charge prediction equation to calculate a timing delay for the circuit design, where the charge prediction equation comprises the set of parameters. The timing analysis can be performed on the circuit design in response to a user instruction (e.g., to an EDA system). For some embodiments, using the stored set of values for the set of parameters with the charge prediction equation results in an equation (e.g., fitted charge prediction equation) that can predict a charge at the input of the cell instance for an arbitrary input voltage waveform. During performance of the time analysis, various embodiments use the resulting charge prediction equation to predict one or more charges at the input of the cell instance (e.g., at arbitrary input voltage values), and the predicted one or more charges can be used to calculate a time delay in the circuit design. For some embodiments, the charge prediction equation comprises Equation 3, where values for parameters r, f, and K are provided from the stored set of values.

Figure 5:
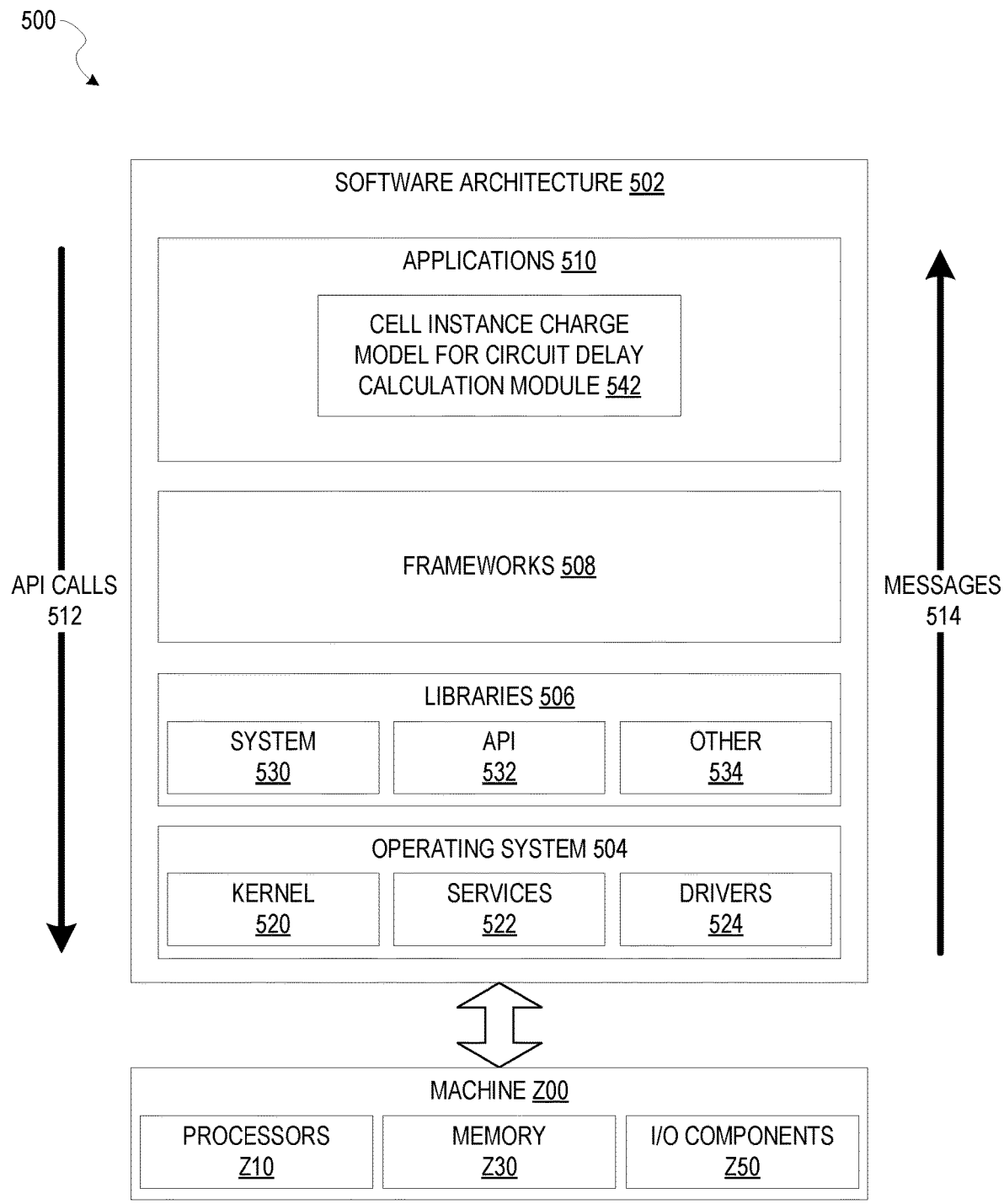
FIG. 5 is a block diagram illustrating an example of a software architecture that may be operating on an EDA computing device and may be used with methods for generation or use of a charge model for a cell instance, according to some embodiments.

FIG. 5 is a block diagram 500 illustrating an example of a software architecture 502 that may be operating on an EDA computer and may be used with methods for generation or use of a charge model for a cell instance, according to some example embodiments. The software architecture 502 can be used as an EDA computing device to implement any of the methods described above.

FIG. 5 is merely a non-limiting example of a software architecture 502, and it will be appreciated that many other architectures can be implemented to facilitate the functionality described herein. In various embodiments, the software architecture 502 is implemented by hardware such as a machine 600 of FIG. 6 that includes processors 610 (e.g., hardware processors), memory 630, and input/output (I/O) components 650. In this example, the software architecture 502 can be conceptualized as a stack of layers where each layer may provide a particular functionality. For example, the software architecture 502 includes layers such as an operating system 504, libraries 506, software frameworks 508, and applications 510. Operationally, the applications 510 invoke application programming interface (API) calls 512 through the software stack and receive messages 514 in response to the API calls 512, consistent with some embodiments. In various embodiments, any client device, any server computer of a server system, or any other device described herein may operate using elements of the software architecture 502. An EDA computing device described herein may additionally be implemented using aspects of the software architecture 502, with the software architecture 502 adapted for generating or using of a charge model for a cell instance in any manner described herein.

In one embodiment, an EDA application of the applications 510 enables and facilitates generation or use of a charge model for a cell instance according to embodiments described herein using various modules within the software architecture 502. For example, in one embodiment, an EDA computing device similar to the machine 600 includes the memory 630 and the one or more processors 610. The processors 610 also implement a cell instance charge model for circuit delay calculation module 542 (hereafter, cell instance charge model module 542) for generation or use of a charge model for a cell instance in accordance with various embodiments described herein.

In various other embodiments, rather than being implemented as modules of the one or more applications 510, the cell instance charge model module 542 may be implemented using elements of the libraries 506, the operating system 504, or the software frameworks 508.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 such as libraries of blocks for use in an EDA environment or other libraries that can provide functions such as memory allocation functions, string manipulation functions, mathematic functions, and the like. In addition, the libraries 506 can include API libraries 532 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and 3D in a graphic context on a display), database libraries (e.g., SQLite to provide various relational database functions), web libraries (e.g., WebKit to provide web browsing functionality), and the like. The libraries 506 may also include other libraries 534.

The software frameworks 508 provide a high-level common infrastructure that can be utilized by the applications 510, according to some embodiments. For example, the software frameworks 508 provide various graphical user interface (GUI) functions, high-level resource management, high-level location services, and so forth. The software frameworks 508 can provide a broad spectrum of other APIs that can be utilized by the applications 510, some of which may be specific to a particular operating system 504 or platform. In various embodiments, the systems, methods, devices, and instructions described herein may use various files, macros, libraries, and other elements of an EDA design environment to implement generation or use of a charge model for a cell instance as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 502, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 600 including processors 610), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 600, but deployed across a number of machines 600. In some example embodiments, the processors 610 or processor-implemented modules are located in a single geographic location (e.g., within a home environment, an office environment, or a server farm). In other example embodiments, the processors or processor-implemented modules are distributed across a number of geographic locations.

Figure 6:
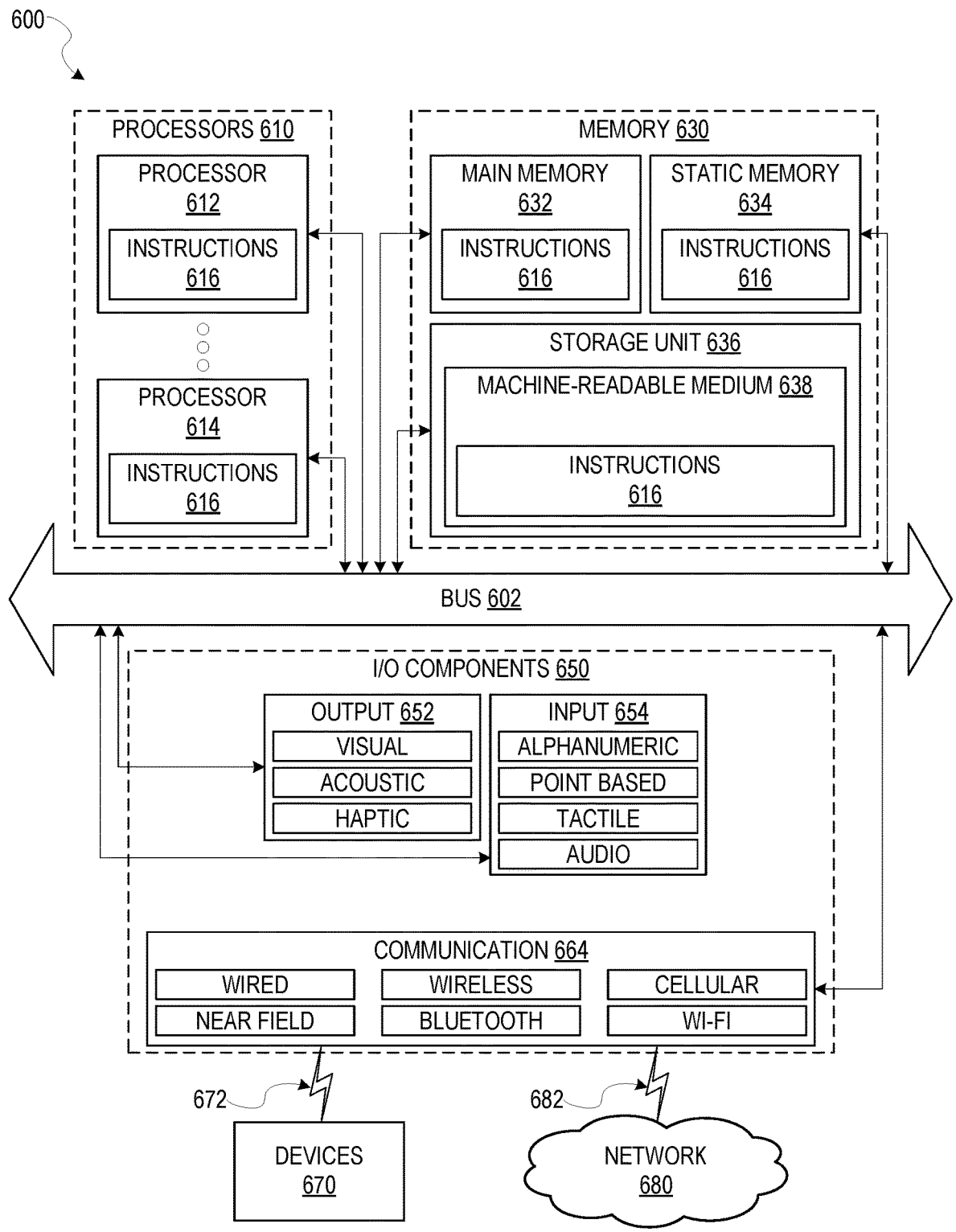
FIG. 6 is a diagram representing a machine in the form of a computer system within which a set of instructions are executed, causing the machine to perform any one or more of the methods discussed herein, according to some example embodiments.

FIG. 6 is a diagrammatic representation of the machine 600 in the form of a computer system within which a set of instructions may be executed for causing the machine 600 to perform any one or more of the methodologies discussed herein, according to an example embodiment. FIG. 6 shows components of the machine 600, which is, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute the instructions 616 contemporaneously. Although FIG. 6 shows multiple processors 610, the machine 600 may include a single processor 612 with a single core, a single processor 612 with multiple cores (e.g., a multi-core processor 612), multiple processors 610 with a single core, multiple processors 610 with multiple cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., the instructions 616) for execution by a machine (e.g., the machine 600), such that the instructions, when executed by one or more processors of the machine (e.g., the processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, the communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine or any of a wide variety of peripheral devices (e.g., a peripheral device coupled via a USB).

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling.

Furthermore, the machine-readable medium 638 is non-transitory (in other words, not having any transitory signals) in that it does not embody a propagating signal. However, labeling the machine-readable medium 638 "non-transitory" should not be construed to mean that the machine-readable medium 638 is incapable of movement; the machine-readable medium 638 should be considered as being transportable from one physical location to another. Additionally, since the machine-readable medium 638 is tangible, the machine-readable medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A non-transitory computer-readable medium comprising instructions that, when executed by a hardware processor of a device, cause the device to perform operations comprising:
   receiving a selection of a cell instance to generate a charge model for an input of the cell instance;
   accessing waveform data for the input of the cell instance, the waveform data describing a plurality of waveforms for the input corresponding to different slews at the input;
   accessing input capacitance data for the input of the cell instance, the input capacitance data describing a plurality of capacitance values at the input as a function of at least one of a voltage level at the input, slew at the input, or a load at an output of the cell instance;
   generating a plurality of equations based on a formulation of the charge model, the waveform data, and the input capacitance data;
   generating a fitted charge model for the input by determining a set of values for a set of parameters of the plurality of equations; and
   storing the set of values for the set of parameters for use in performing timing analysis of a circuit design that includes the cell instance.

2. The non-transitory computer-readable medium of claim 1, wherein the operations comprise:
   performing timing analysis of the circuit design by using the stored set of values for the set of parameters with a charge prediction equation to calculate a timing delay for the circuit design, the charge prediction equation comprising the set of parameters.

3. The non-transitory computer-readable medium of claim 1, wherein the cell instance comprises at least one of an inverter or a buffer.

4. The non-transitory computer-readable medium of claim 1, wherein the waveform data is accessed from library data for the cell instance.

5. The non-transitory computer-readable medium of claim 4, wherein the library data is cell library data.

6. The non-transitory computer-readable medium of claim 1, wherein the input capacitance data is accessed from cell library data for the cell instance.

7. The non-transitory computer-readable medium of claim 1, wherein the plurality of waveforms comprises different pluralities of waveforms for different voltage thresholds.

8. The non-transitory computer-readable medium of claim 1, wherein the plurality of waveforms described by the waveform data correspond to M different slew index values and N different threshold voltage index values; and
   wherein the plurality of equations comprises M×N equations.

9. The non-transitory computer-readable medium of claim 1, wherein each equation in the plurality of equations corresponds to a different timepoint in an individual waveform of the plurality of waveforms.

10. The non-transitory computer-readable medium of claim 1, wherein the formulation comprises a discretized formulation of an input charge at the input.

11. The non-transitory computer-readable medium of claim 10, wherein the input charge at the input is determined by:

$$q = C_{IN} * V_{IN} + C_{BM} * V_{OUT},$$

where $C_{IN}$ is a static input capacitance at the input, where $V_{IN}$ is an input voltage at the input, where $C_{BM}$ is a back-Miller capacitance at the input, and where $V_{OUT}$ is an output voltage at the output.

12. The non-transitory computer-readable medium of claim 1, wherein the determining of the set of values for the set of parameters of the plurality of equations comprises using least squares to determine the set of values for the set of parameters that at least approximately solves the plurality of equations.

13. The non-transitory computer-readable medium of claim 1, wherein the determining of the set of values for the set of parameters of the plurality of equations comprises using least squares to determine the set of values for the set of parameters that at least approximately solves a sub-plurality of equations in the plurality of equations.

14. The non-transitory computer-readable medium of claim 13, wherein the plurality of waveforms described by the waveform data correspond to N different threshold voltage index values, wherein the sub-plurality of equations comprises 2N+1 equations selected from the plurality of equations.

15. A device comprising:
   a memory storing instructions; and
   a hardware processor communicatively coupled to the memory and configured by the instructions to perform operations comprising:
      accessing waveform data for an input of a cell instance, the waveform data describing a plurality of waveforms for the input corresponding to different slews at the input;
      accessing input capacitance data for the input of the cell instance, the input capacitance data describing a plurality of capacitance values at the input as a function of at least one of a voltage level at the input, slew at the input, or a load at an output of the cell instance;
      generating a plurality of equations based on a formulation of a charge model for the input of the cell instance, the waveform data, and the input capacitance data;
      generating a fitted charge model for the input by determining a set of values for a set of parameters of the plurality of equations; and storing the set of values for the set of parameters for use in performing static timing analysis of a circuit design that includes the cell instance.

16. The device of claim 15, wherein the formulation comprises a discretized formulation of an input charge at the input.

17. The device of claim 16, wherein the input charge at the input is determined by:

$$q = C_{IN} * V_{IN} + C_{BM} * V_{OUT},$$

where $C_{IN}$ is a static input capacitance at the input, where $V_{IN}$ is an input voltage at the input, where $C_{BM}$ is a back-Miller capacitance at the input, and where $V_{OUT}$ is an output voltage at the output.

18. The device of claim 15, wherein fitting a set of parameters of the plurality of equations based on the waveform data and the input capacitance data comprises using least squares to determine the set of values for the set of parameters that at least approximately solves the plurality of equations.

19. The device of claim 15, wherein fitting a set of parameters of the plurality of equations based on the waveform data and the input capacitance data comprises using least squares to determine the set of values for the set of parameters that at least approximately solves a sub-plurality of equations in the plurality of equations.

20. A method comprising:

accessing, by a hardware processor, waveform data for an input of a cell instance, the waveform data describing a plurality of waveforms for the input corresponding to different slews at the input;

accessing, by the hardware processor, input capacitance data for the input of the cell instance, the input capacitance data describing a plurality of capacitance values at the input as a function of at least one of a voltage level at the input, slew at the input, or a load at an output of the cell instance;

generating, by the hardware processor, a plurality of equations based on a formulation of a charge model for the input of the cell instance, the waveform data, and the input capacitance data;

generating, by the hardware processor, a fitted charge model for the input by determining a set of values for a set of parameters of the plurality of equations; and using, by the hardware processor, the set of values for the set of parameters with a charge prediction equation to calculate a timing delay for a circuit design that includes the cell instance, the charge prediction equation comprising the set of parameters.

* * * * *